United States Patent [19]

Ito

[11] Patent Number: 5,778,159
[45] Date of Patent: Jul. 7, 1998

[54] DATA OUTPUTTING WITH CONTROL OF NUMBER OF GRADATIONS EXPRESSED

[75] Inventor: Nobuyasu Ito, Yokohama, Japan

[73] Assignee: Canon Kabushiki Kaisha, Tokyo, Japan

[21] Appl. No.: 285,528

[22] Filed: Aug. 4, 1994

Related U.S. Application Data

[63] Continuation of Ser. No. 741,072, Aug. 6, 1991, abandoned.

[30] Foreign Application Priority Data

Aug. 8, 1990 [JP] Japan ..................... 2-208056

[51] Int. Cl.⁶ ............... G06K 15/00; H04N 1/21; H04N 1/40
[52] U.S. Cl. ............ 395/109; 395/112; 395/116; 358/455; 358/462; 358/444
[58] Field of Search ............ 358/298, 455, 358/456, 457, 458, 459, 460, 444, 443, 445, 448, 534, 521, 462, 467, 465, 466; 395/109; 382/172, 176, 270, 271, 272

[56] References Cited

U.S. PATENT DOCUMENTS

| | | | |
|---|---|---|---|
| 4,547,811 | 10/1985 | Ochi et al. | 358/455 |
| 4,681,470 | 7/1987 | Nakajima . | |
| 4,707,745 | 11/1987 | Sakano | 358/456 |
| 4,729,035 | 3/1988 | Tanioka | 358/455 |
| 4,851,920 | 7/1989 | Sakano | 358/456 |
| 4,884,147 | 11/1989 | Arimoto et al. | 358/443 |
| 4,937,681 | 6/1990 | Fujinawa et al. . | |
| 4,949,190 | 8/1990 | Thompson | 358/426 |
| 4,999,629 | 3/1991 | Katsuta | 358/462 |
| 5,003,494 | 3/1991 | Ng . | |
| 5,016,114 | 5/1991 | Sakata | 358/449 |
| 5,057,914 | 10/1991 | Tsuji | 358/534 |
| 5,125,072 | 6/1992 | Ng | 395/112 |
| 5,278,919 | 1/1994 | Sugiura et al. | 358/462 |
| 5,309,254 | 5/1994 | Kuwabara et al. | 358/455 |

FOREIGN PATENT DOCUMENTS

| | | |
|---|---|---|
| 320713 | 6/1989 | European Pat. Off. . |
| 2543994 | 9/1990 | France . |
| 62-180665 | 8/1987 | Japan . |
| 63-59674 | 3/1988 | Japan . |
| 109963 | 4/1989 | Japan . |
| 30561 | 1/1990 | Japan . |
| 153764 | 6/1990 | Japan . |

*Primary Examiner*—Scott Rogers
*Attorney, Agent, or Firm*—Fitzpatrick, Cella, Harper & Scinto

[57] ABSTRACT

In an outputting method and apparatus for use with a laser beam printer or the like which handles binary data or multivalue data and can express a density of a half, the capacity of a memory provided in the printer is detected and the gradation number of multivalue image data is changed or reduced in a smaller gradation number, e.g., binary data, in accordance with the memory capacity. A part of the input multivalue image data is set in white or black binary data values. Thus, an image of a high quality can be promptly generated with high precision, and the data amount to be processed can be reduced.

24 Claims, 11 Drawing Sheets

| D | D | D | D | D | D | D | D |
| A | A | A | A | A | A | A | A |
| T | T | T | T | T | T | T | T |
| A | A | A | A | A | A | A | A |
| 7 | 6 | 5 | 4 | 3 | 2 | 1 | 0 |

DATA OUTPUTTING WITH CONTROL OF NUMBER OF GRADATIONS EXPRESSED

This application is a continuation-in-part of application Ser. No. 07/741,072, filed Aug. 6, 1991, now abandoned.

BACKGROUND OF THE INVENTION

1. Field of the Invention

The present invention relates to an outputting method and apparatus for use in with a laser beam printer or the like which handles binary data or multivalue data and can express a density of a halftone image.

2. Related Background Art

Hitherto, in image data having halftone gradations, multivalue data in which one pixel is constructed by a plurality of bits is needed to express the gradation number. The dither method, density pattern method, and the like have been known as means for binarizing and expressing multivalue data.

The phase control method (time modulation method) has been known as one type of density pattern method. According to the time modulation method, one pixel is divided in the main scanning direction of a laser and on/off operations are repeated, in such manner as to express an image of halftone.

Figure 7A:
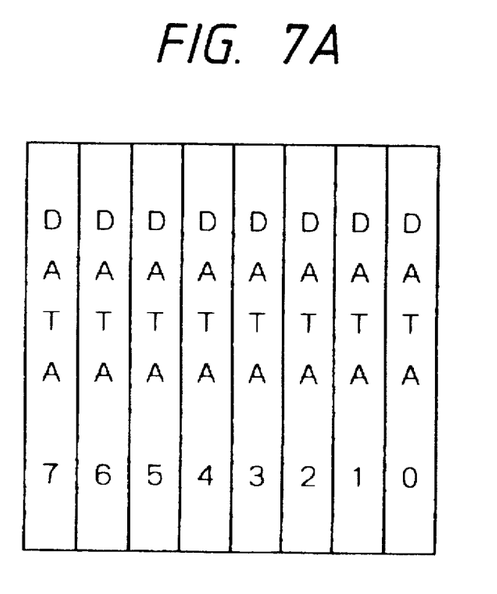
FIG. 7A is a diagram showing an example in which one pixel has been divided into eight portions by the time modulation method.
Figure 7B:
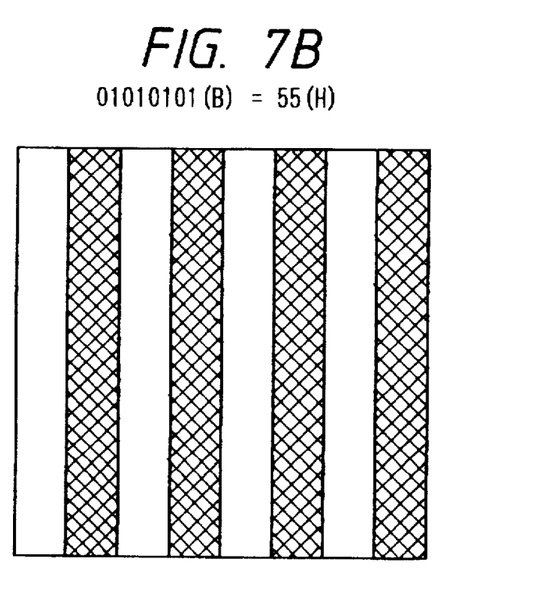
FIG. 7B is a diagram showing an example of a density pattern of the divided pixels.

FIG. 7A shows an example in the case where one pixel has been divided into eight data DATA0 to DATA7 by the time modulation method. Now, assuming that DATA7 is the MSB and DATA0 is the LSB, a density pattern which is expressed by data of, e.g., 55(H) (H indicates a hexadecimal number) is as shown in FIG. 7B. The pixel of the image data obviously needs a memory of excessively large capacity compared to the binary data of black and white such as character data.

Figure 8:
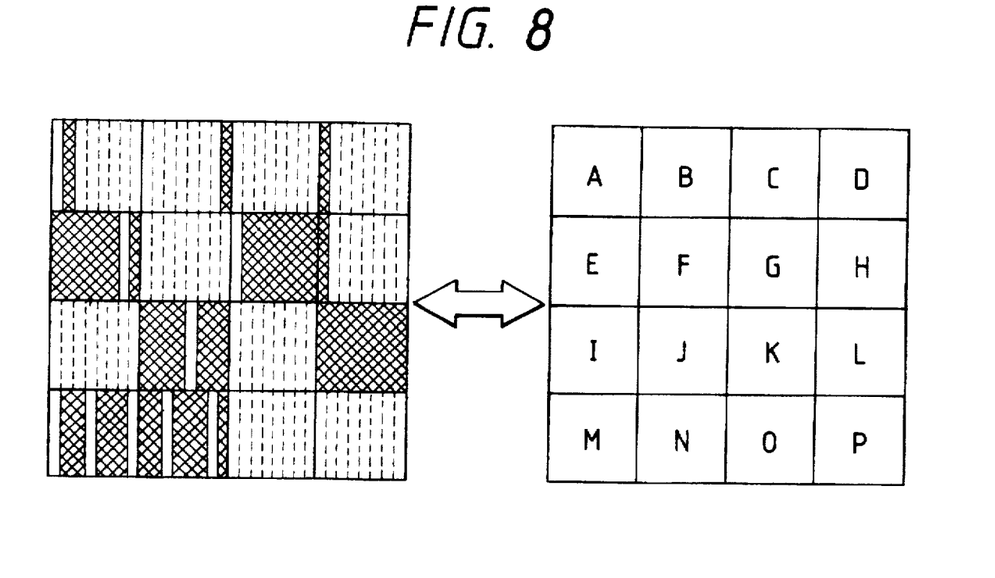
FIG. 8 is a diagram showing an example in which an image of halftones (intermediate gradation) has been expressed by a plurality of pixels divided by the time modulation method.

FIG. 8 shows an example in which an image of halftones has been expressed by a plurality of pixels divided by the time modulation method. In the diagram, a pixel "E", as an example of image near black (corresponding to data FF(H)), is expressed by FD(H). A pixel "G" is expressed by 7F(H). A pixel "J" is expressed by F7(H). A pixel "A" as an image near white (corresponding to data 00(H)) is expressed by 40(H). A pixel "C" is expressed by 01(H). A pixel "D" is expressed by 80(H).

However, in the above conventional example, the amount of data necessary to express an image which is close to black as a whole or near white is the same as the amount of data which is required to express a halftone such as pixels "M", "N", or the like (data length is set have to 8 bits), so that there is a problem that memories having the same capacity must be prepared for all of these data. There is also a problem that the number of gradations is also influenced by the capacity of a memory installed in the apparatus at present and it is desirable that the number of gradations can be variably set.

Hitherto, the number of gradations of the multivalue data to express halftones is always constant irrespective of memory area in an output apparatus, for instance, in a printer.

On the other hand, in the above conventional example, the number of gradations of the multivalue data is limited by the capacity of a standard memory provided in the printer.

SUMMARY OF THE INVENTION

The invention is made in consideration of the above problems, and it is an object of the invention to provide an outputting method and apparatus whereby, in the case of processing an image near black or an image near white, an image expressed by multivalue data is converted into binary black or white data, so that a high quality can be maintained in accordance with the memory capacity.

The invention is made in consideration of the above problems, and it is another object of the invention to provide an outputting method and apparatus in which a range of values for conversion into binary data can be variably set.

The invention is made in consideration of the above problems, and still another object of the invention is to provide an outputting method and apparatus in which the number of gradations can be changed in accordance with the present memory capacity.

Still another object of the invention is to provide an outputting method and apparatus which function so as to change high gradation data near white or black into lower gradation data in accordance with memory capacity and so to reduce data amount, or which can variably set a range within which high gradation data is to be changed into lower gradation data.

DETAILED DESCRIPTION OF THE PREFERRED EMBODIMENTS

The preferred embodiment according to the invention will be described in detail hereinbelow with reference to the drawings. The invention can be accomplished by a system comprising a plurality of apparatuses or can be also accomplished by an apparatus comprising one unit. The invention can also be applied to the case where the invention is accomplished by providing a program to the system or apparatus.

Figure 1:
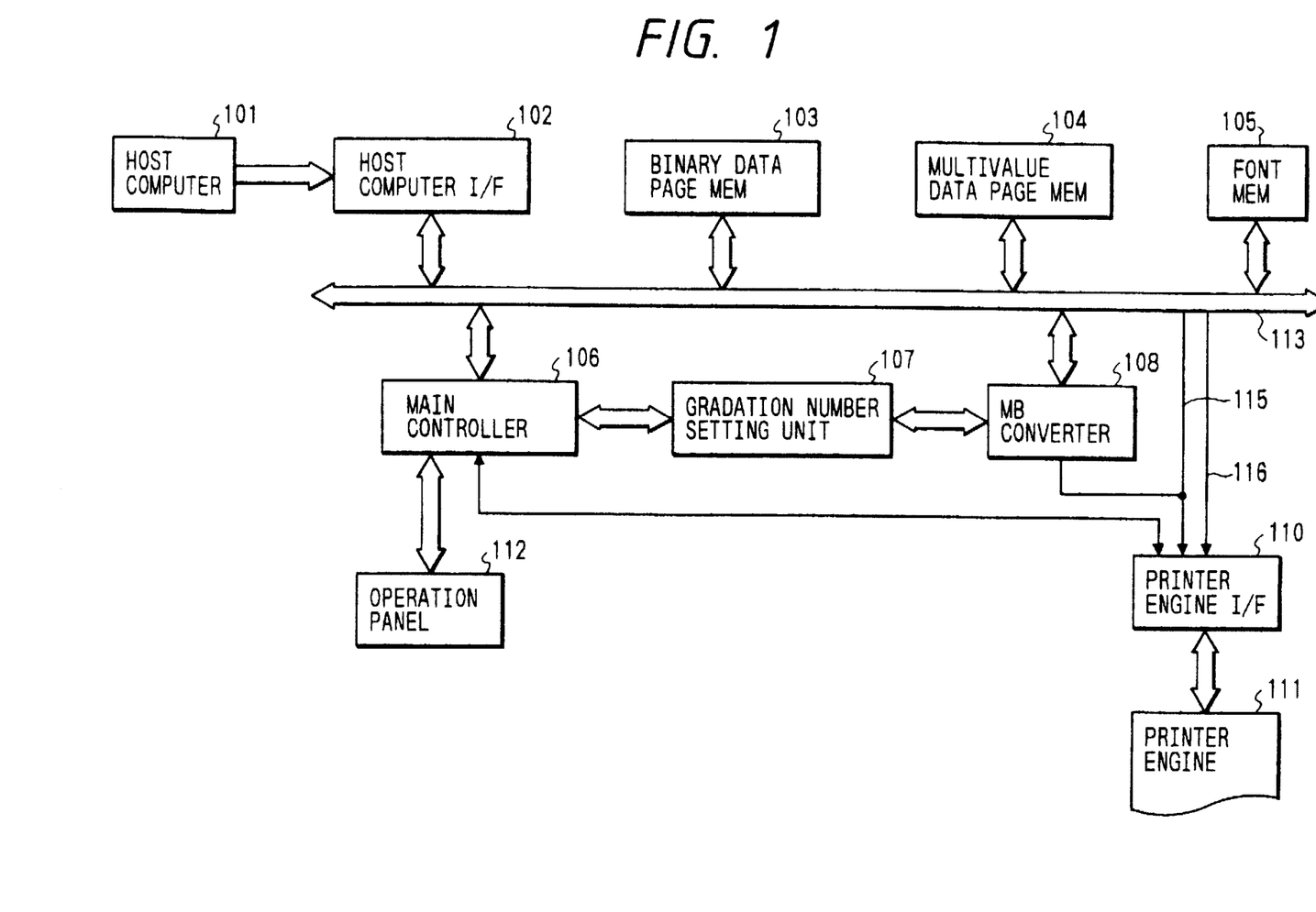
FIG. 1 is a block diagram showing a construction of a whole printer as an embodiment of the invention.

FIG. 1 is a block diagram showing a construction of a printer according to an embodiment of the invention. In the diagram, a main controller 106 controls the whole printer in accordance with a program stored in a ROM (not shown). Print data such as images, characters, or the like with the gradation number (number of gradations used) which is sent from a host computer 101 is stored in individual memories corresponding to the kind of data through a host computer I/F 102 which serves as an interface section with the host computer 101. That is, image data is stored into a multivalue data page memory 104 and character data such as a character code or the like is stored into a binary data page memory 103. Font data for the character data is stored in a font memory 105. The gradation number of the multivalue data is stored in a gradation number setting unit 107.

Binary data such as a character or the like is sent from the binary data page memory 103 to a printer engine I/F 110 through a bus 113 and a binary data signal line 115. As will be explained hereinbelow, predetermined multivalue data is supplied from the multivalue data page memory 104 to a multivalue-to-binary converter (hereinafter, referred to as an MB converter) 108. After the multivalue data is converted into the binary data by the MB converter 108, it is sent to the printer engine I/F 110. The multivalue data other than the above data is sent from the multivalue data page memory 104 to the printer engine I/F 110 as multivalue data through the bus 113 and a multivalue data bus 116. The printer engine I/F 110 switches the input binary data and multivalue data under control of the main controller 106 and transfers to a printer engine 111.

The gradation number can be set or changed in accordance with the operation of an operation panel 112 and input data from the host computer 101. The set value of the gradation number is stored into the gradation number setting unit 107.

Figure 2A:
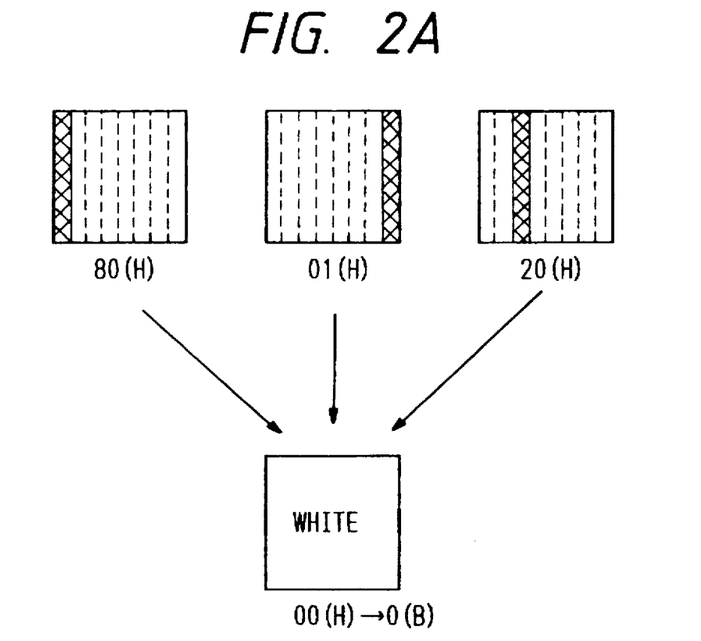
FIGS. 2A and 2B are diagrams for explaining states in which pixels divided by a time modulation method are converted into white or black binary data.

FIG. 2A shows three pixels divided into eight portions by the time modulation method on the basis of multivalue data in each of which only arbitrary one bit of the pixel indicates black and which image data is illustrated, such pixels are close to white as a whole is converted into binary white data. That is, the data corresponding to 80(H) or 01(H) or the like is converted into 0(B) as white binary data here.

Figure 2B:
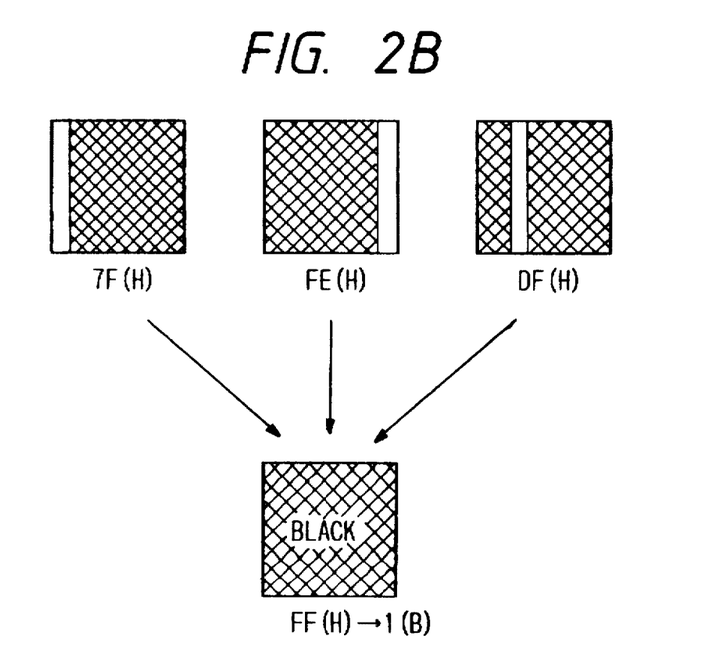

In a manner similar to the above, for image data in which only one bit of the pixel indicates white and which is close to black as a whole, as shown in FIG. 2B, the data corresponding to 7F(H), FE(H), or the like is converted into black binary data 1(B).

The processing of the binary data or multivalue data in the printer engine I/F 110 will now be described.

Figure 3:
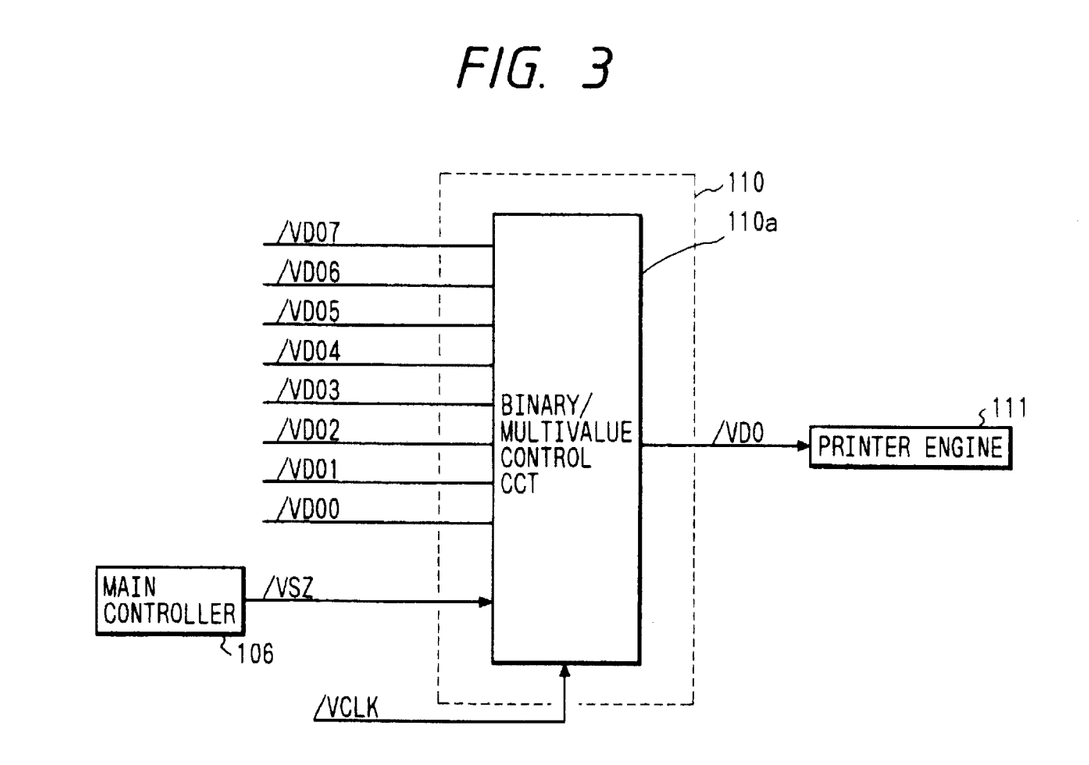
FIG. 3 is a block diagram showing a construction of a printer engine I/F and its peripheral components.

FIG. 3 is a block diagram showing a construction of the printer engine I/F 110 and its peripheral components. In the diagram, a switching signal /VSZ indicating whether the data input to a binary/multivalue control circuit 110a is binary data or multivalue data is supplied from the main controller 106 to the binary/multivalue control circuit 110a. That is, multivalue data /VDO$_7$ to /VDO$_0$ constructed by eight bits are supplied to the binary/multivalue control circuit 110a of the printer engine I/F 110 through the multivalue data bus 116 (FIG. 1) corresponding to those signals. The binary data is supplied through the binary data signal line 115, namely, a /VDO$_7$ signal line.

Figure 4A:
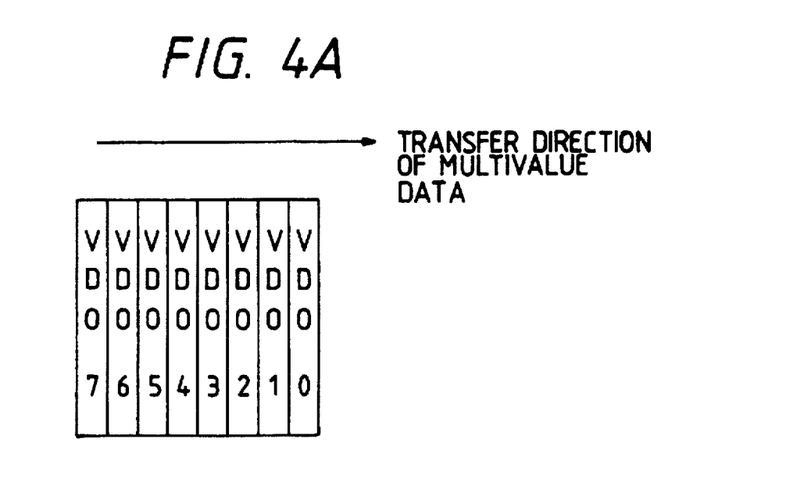
FIG. 4A is a diagram showing the transfer direction of multivalue data.
Figure 4B:
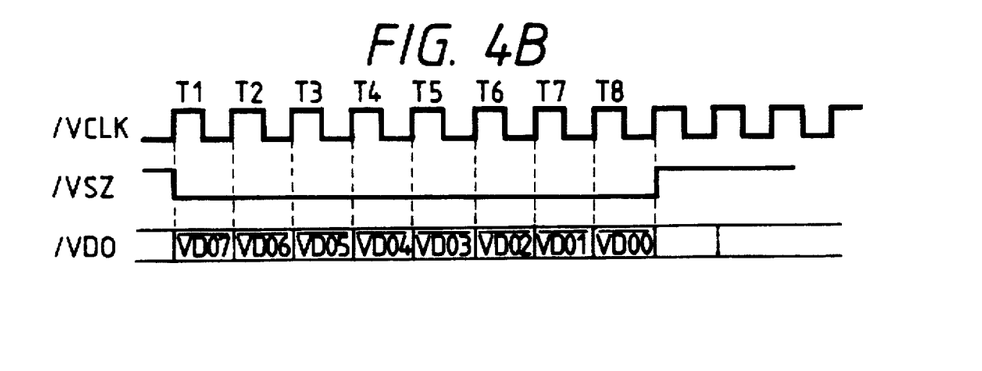
FIG. 4B is an output time chart of binary data which is transferred from a binary/multivalue control circuit to a printer engine.

FIG. 4B is an output time chart of multivalue data which is sent from the binary/multivalue control circuit 110a to the printer engine 111.

As shown in FIG. 4B, the multivalue data /VDO is transferred to the printer engine 111 in the transfer direction shown by an arrow in FIG. 4A synchronously with a clock signal /VCLK from a clock generating unit (not shown) for a period of time when the /VSZ signal is at the low "L" level.

Figure 4C:
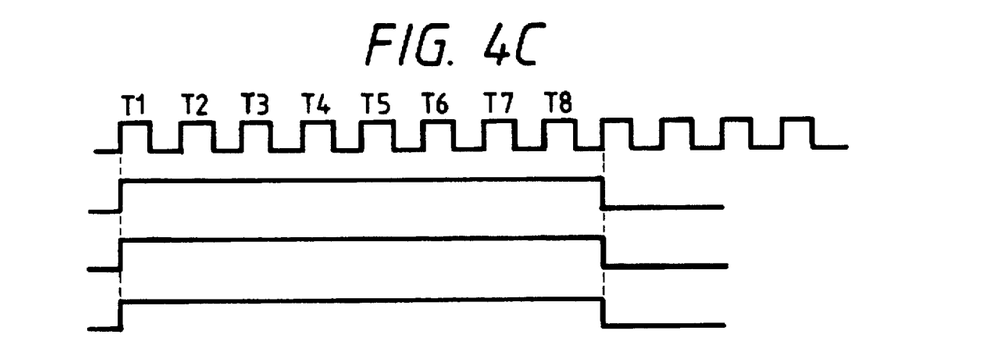
FIG. 4C is an output time chart of the multivalue data.

On the other hand, as shown in FIG. 4C, the binary data is transferred for a period of time when the /VSZ signal is at the high "H" level (for eight clocks of the /VCLK signal). If the /VDO$_7$ signal is at the "H" level for such period of time, the binary data is black data (in the case of FIG. 4C). If it is at the "L" level, the binary data is white data. When the binary data is transferred, that is, when the /VSZ signal is at the "H" level, the input signals to /VDO$_6$ to /VDO$_0$ of the binary/multivalue control circuit 110a are ignored.

The printing processing procedure in the printer of this embodiment will now be described hereinbelow with reference to a flowchart shown in FIG. 5.

Figure 5:
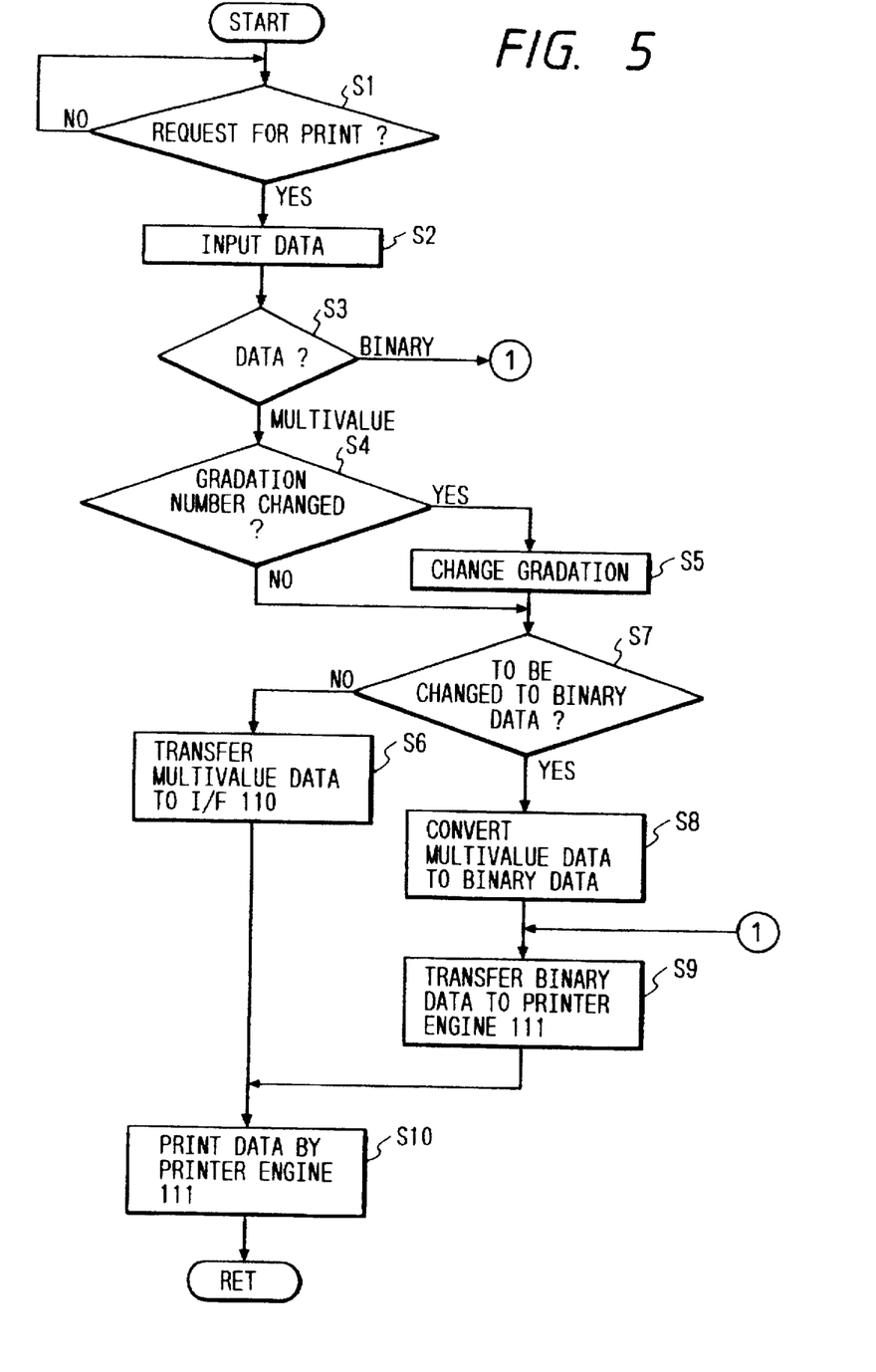
FIG. 5 is a flowchart showing a printing processing procedure in the printer of the embodiment of FIG. 1.

In step S1 in FIG. 5, the main controller 106 checks to see if there is a request to print from the operation panel 112 or host computer 101 or not. If YES, step S2 follows and the data are fetched from the binary data page memory 103 and multivalue data page memory 104. In step S3, a check is made to see if the fetched data is the binary data or multivalue data.

If the input data is the binary data in step S3, the processing routine advances to step S9, which will be explained hereinbelow. If the input data is multivalue data, step S4 follows and the main controller 106 checks to see if the gradation number of the multivalue data stored in the gradation number setting unit 107 and the gradation number of the print request have been changed when the data was stored from the host computer 101 in the multivalue data page memory 104 or not. If YES, the gradation is changed in step S5.

After completion of the processing in step S5, or if there is no change in gradation number of the multivalue data in the discriminating step S4, step S7 follows and the main controller 106 analyzes the input multivalue data, discriminating whether the multivalue data is data near black or white or not on the basis of the bit pattern obtained by dividing the pixel by the time modulation method. If it is determined in step S7 that the multivalue data should be generated as it is, namely, if NO is the result in step S7, the processing routine advances to step S6 and the multivalue data is transferred to the printer engine I/F 110. In subsequent step S10, the multivalue data is printed by the printer engine 111. However, if the multivalue data should be converted into the binary data on the basis of the bit pattern, the processing routine advances to step S8 and the multivalue data is converted into binary black or white data. The converted binary data is transferred to the printer engine I/F 110 in step S9 and printed by the printer engine 111 in step S10.

As described above, according to this embodiment, by converting the multivalue data of an image near black or white into the binary black or white data, there is an effect that the use efficiency of the memory which is required for the image data processes can be improved.

Figure 6:
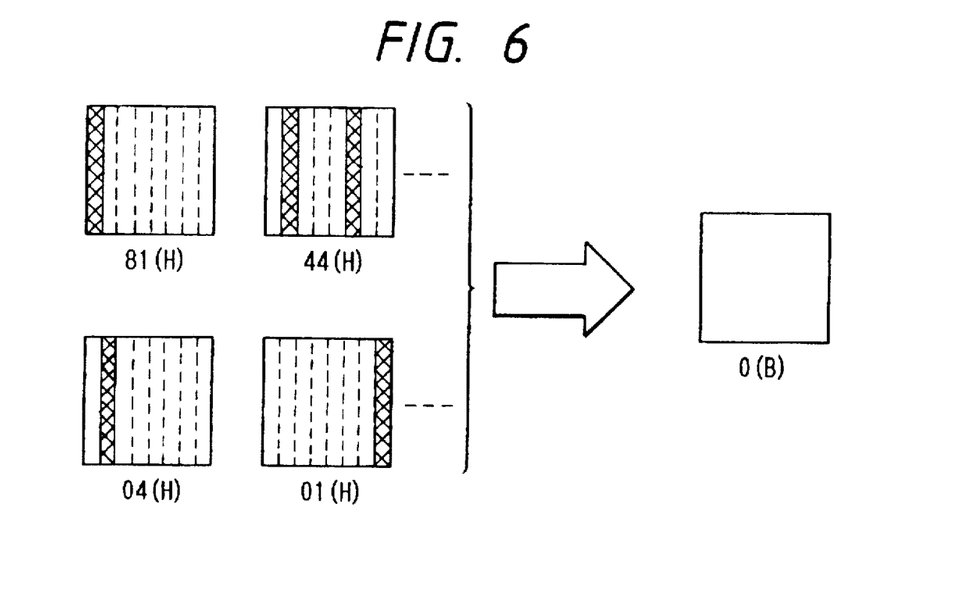
FIG. 6 is a diagram showing another example in the case of converting multivalue data into binary data.

In this embodiment, the image data in which only one bit of the pixel divided by the time modulation method in the multivalue image data indicates black or only one indicating white has been converted into binary data. However, as shown in FIG. 6, image data in which two or more bits of the pixel divided by the time modulation method indicate black or white can be also converted into binary data.

Although the foregoing embodiment has been described with respect to the time modulation method as an example of a method of expressing a halftone, the invention can be also applied to a dither method or a density pattern method.

(Another embodiment)

Figure 9:
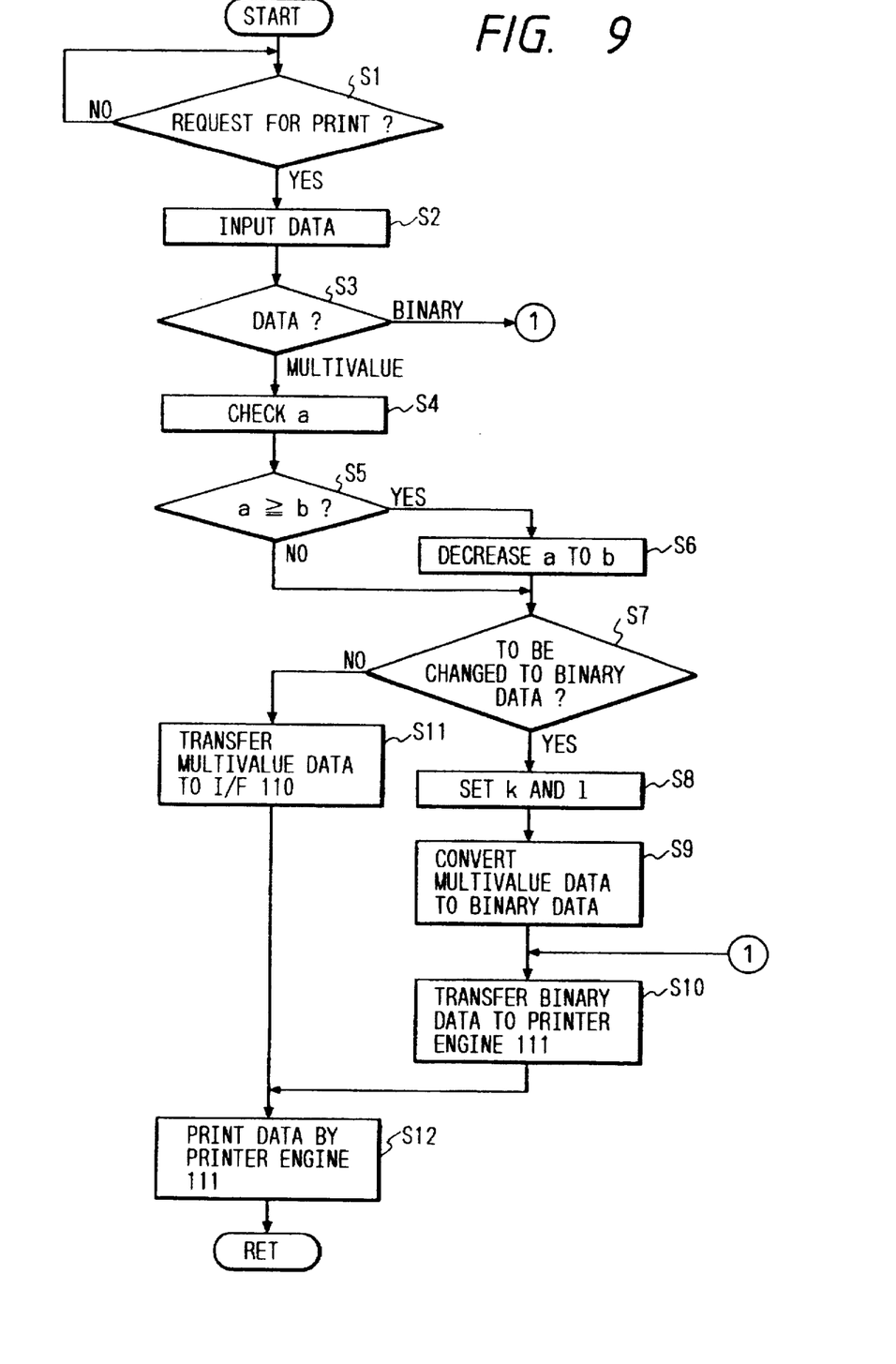
FIG. 9 is a flowchart for variably setting a region to approximate multivalue data by binary black or white.

FIG. 9 shows a flowchart illustrating the case of setting an approximate gradation number in the case of changing multivalue data into the binary data in the flowchart shown in FIG. 5. Steps S1 to S3 in FIG. 9 are the same as those in FIG. 5. In step S4, a gradation number a of the multivalue data is checked. Assuming that the maximum value of the gradation number at which the printer can print is b, a check is made in step S5 to see if the value of a is equal to or larger than the value of b or not. If a≧b, the gradation number of the multivalue data is reduced from a to b in step S6.

Since the print result cannot exceed the maximum value (number of gradations) of halftone which can be printed by the printer, the gradation number of the multivalue data is set in accordance with the maximum value of the gradation number of the printer.

Figure 10:
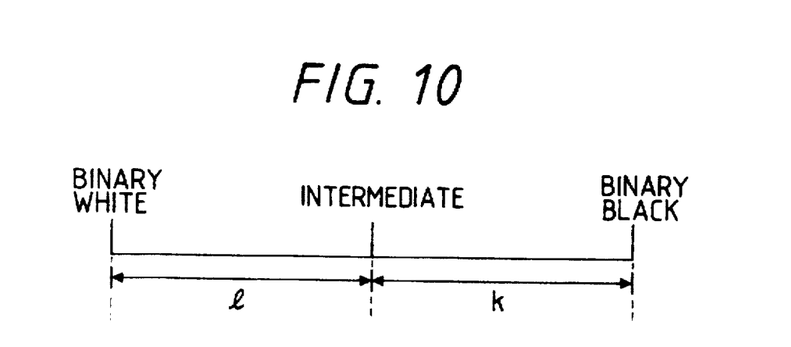
FIG. 10 is an explanatory diagram for setting the region shown in FIG. 9.

A check is now made in step S7 to see if the multivalue data is approximated to the binary data or not. If NO in step S7, step S11 follows and the multivalue data is transferred to the printer engine. The result of the decision in step S7 can also be set by a command from the host computer or the operation panel or can be set by discriminating the memory capacity. If the approximation is executed, gradation numbers k (black) and l (white) which are approximated to binary black data and binary white data are respectively set in step S8. As shown in FIG. 10, the values of k and l are stored in the gradation number setting unit 107 in FIG. 1. The values of k and l can be also sequentially set by the user by a command from the host computer (for instance, on a page unit basis) or through the operation panel.

For instance, in a case where a draft of a design for a block copy is formed and an examination such as layout or the like is executed, there is no need to express and reproduce the multivalue data at a high precision. Therefore, by setting the values of k and l to values near the intermediate gradation numbers in step S8, respectively, the processing time of the multivalue data is reduced. Thus, the print result can be obtained rapidly.

(Another embodiment)

The case of changing the gradation number of the multivalue image in accordance with the capacity of the memory provided in the printer will now be described.

Figure 11:
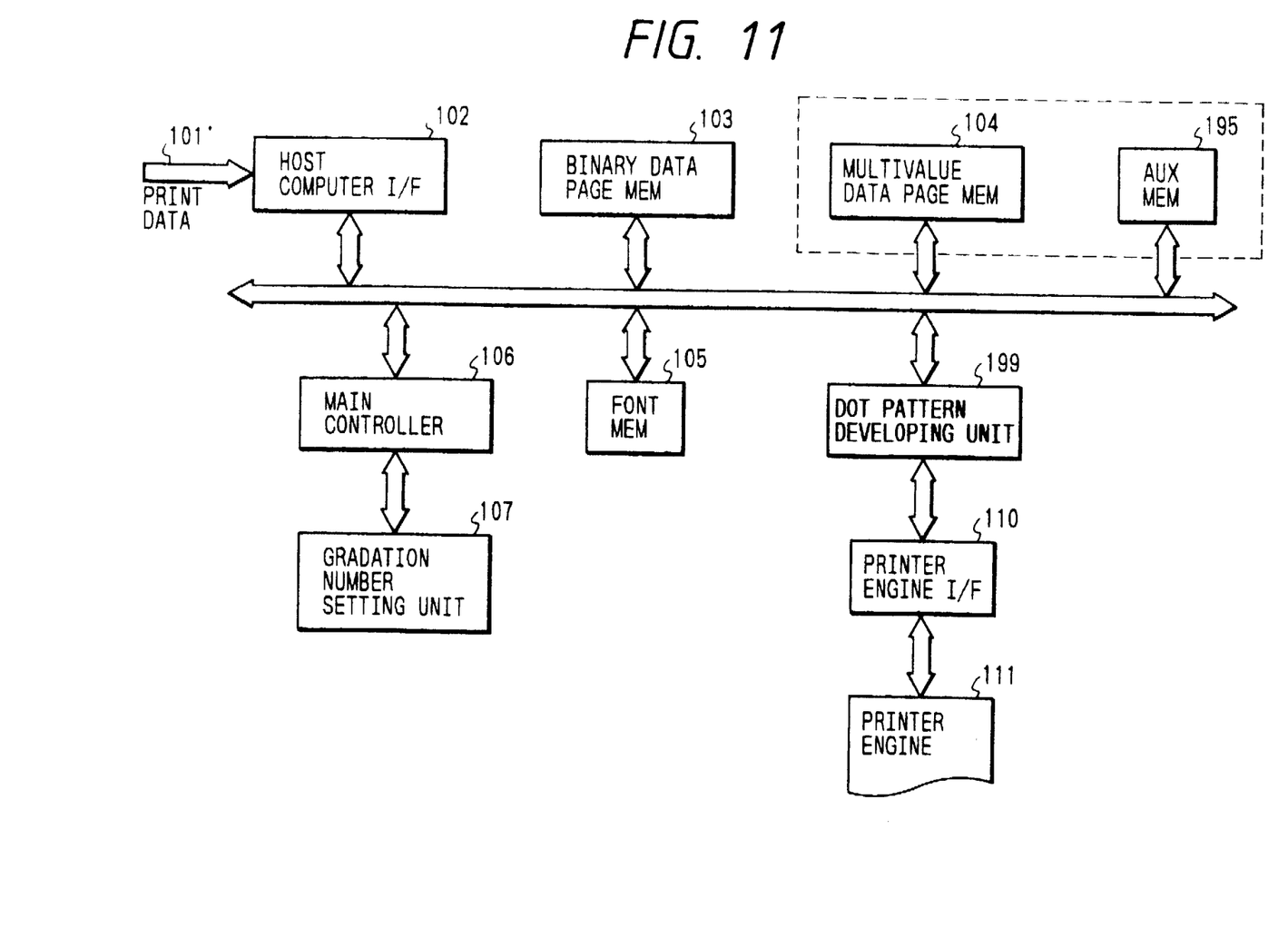
FIG. 11 is a constructional block diagram illustrating the case where a memory capacity can be expanded.

FIG. 11 is a diagram most suitably showing an example of a construction of still another embodiment of the invention. In the diagram, reference numeral 101' denotes print data which is sent from the host computer; 102 the host computer I/F; 103 the binary data page memory; 104 the multivalue data page memory; 195 an auxiliary memory which can be expanded; 106 the main controller of the printer; 107 the setting unit to set the gradation number of the multivalue data; 105 a font memory; 199 a dot pattern developing unit; 110 the printer engine I/F; and 111 the printer engine.

The print data 101' which is sent from the host computer is stored in individual memories by the main controller 106 on the basis of the kind of data. That is, image data is stored in the multivalue data page memory 104 and character data is stored in the binary data page memory 103. In the case of a page printer, print data of one page has been prepared in the page memory. Therefore, the print data is developed in the dot pattern developing unit 199 and is generated as an on/off signal (serial signal) 9 for the laser and sent to the printer engine.

If the capacity of the multivalue data page memory 104 is insufficient for one page of the multivalue data sent from the host computer, the gradation number setting unit 107 sets the gradation number in a value smaller than the gradation number of the multivalue data, thereby enabling the multivalue data to be stored in the multivalue data page memory 104.

Assuming that the multivalue input data from the host computer has n gradations (n≧16), the printer judges whether the multivalue input data is stored into the memory by 16 gradations or by, for instance, 4 gradations by referring to the capacity of the memory provided in the printer. The relation between the gradation number and the memory capacity and a method of reducing the gradation number will now be described.

Figure 12:
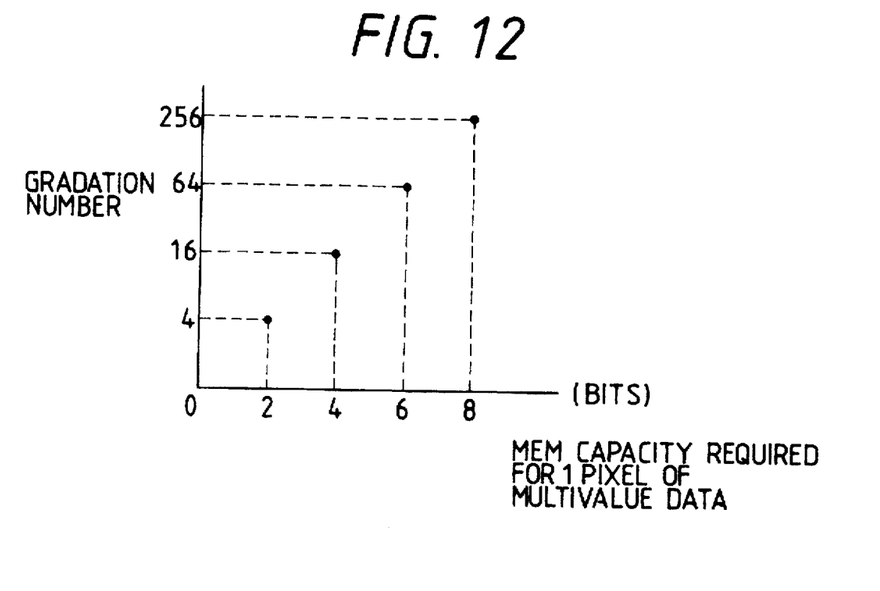
FIG. 12 is a diagram showing the relation between the gradation number and the memory capacity.

FIG. 12 shows the relation between the memory capacity which is required to express the gradation number of one pixel of the multivalue image and the gradation number of the image.

The ordinate axis indicates the gradation number of an image and shows an interval converted into a logarithmic value. The abscissa axis indicates the memory capacity of one pixel of the image. For instance, in the case of 64 gradations, data of 6 bits is needed because $2^6=64$. As shown in the diagram, the memory capacity also increases with an increase in number of gradations.

Figure 13:
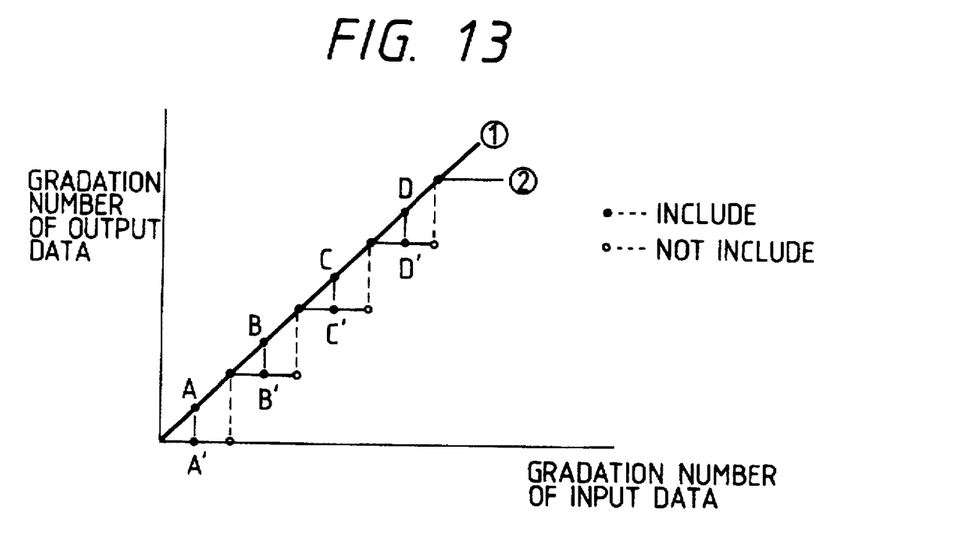
FIG. 13 is a diagram showing the relation between the gradation number of input data and the gradation number of output data.

FIG. 13 shows the gradation number of the input data and the gradation number of the output data. A straight line ① shows the case where the input multivalue data has been generated by the original gradation number at a high precision and a straight line ② indicates the case where it has been generated by a gradation number smaller than the gradation number of ①.

For instance, by reducing the output gradation number at a point B, the output gradation number decreases to a point B'. The reduced gradation number is changed step by step without continuously changing the gradation number as shown in ①.

As mentioned above, this embodiment has been devised so as to process the multivalue data which needs a memory capacity larger than that in the case of the binary character data.

In the above described embodiment, the printer side detects the capacity of the multivalue data page memory provided in the printer. However, the output gradation number can be also set by application software on the host computer side. Further, if the set gradation number is too large and the needed memory capacity in the printer is lacking, the printer sends a status signal to the host computer, thereby also enabling the status to be displayed via the application software of the host computer.

[Description of laser beam printer (FIG. 14)]

A construction of a laser beam printer to which the invention can be applied will now be described with reference to FIG. 14.

Figure 14:
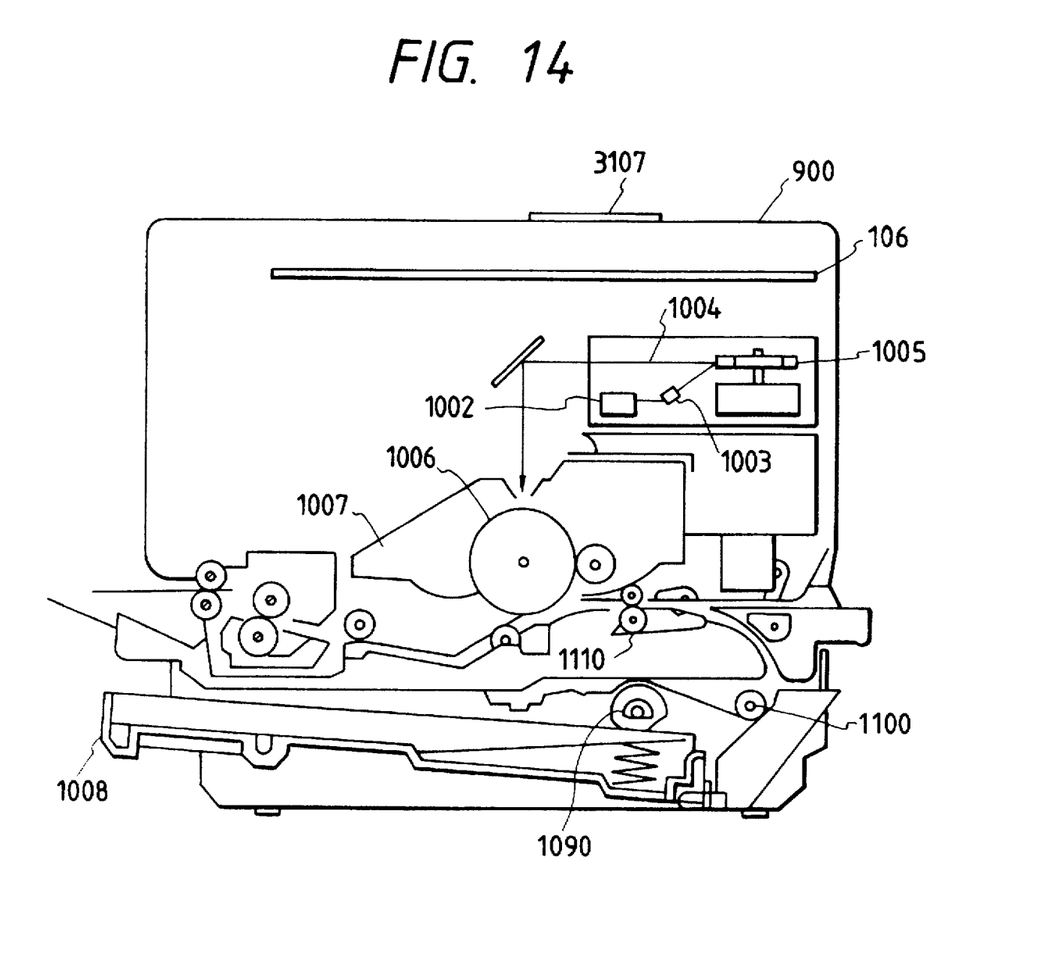
FIG. 14 is a diagram showing the structure of a laser beam printer.

FIG. 14 is a cross sectional view showing the internal structure of the laser beam printer (hereinafter, abbreviated to LBP) of the present embodiment. The LBP can register a character pattern from a data source (not shown) or can register a form or the like.

In the diagram, reference numeral 900 denotes the LBP main body. The LBP main body receives and stores character data (character code), form data, macro instruction, and the like which are supplied from the host computer (101 in FIG. 1) connected to the outside. In accordance with the above data, the LBP main body 900 forms a corresponding character pattern, a form pattern, or the like and forms an image onto a recording paper as a recording medium. Reference numeral 3107 denotes an operation panel on which switches for operation, an LED display, and the like are arranged. Reference numeral 106 denotes the printer control unit (main controller) to control the whole LBP 900 and to analyze the character data or the like which is sent from the host computer. The printer control unit 106 mainly converts character data into a video signal and supplies the latter to a laser driver 1002.

The laser driver 1002 is a circuit to drive a semiconductor laser 1003 and on/off switches a laser beam 1004 which is emitted from the semiconductor laser 1003 in accordance with an input video signal. The laser beam 1004 is oscillated to the right and left by a rotary polygonal mirror 1005 and scans on an electrostatic drum 1006. Due to this, an electrostatic latent image of a character pattern is formed on the drum 1006. The latent image is developed by a developing unit 1007 arranged around the drum 1006 and, after that, it is copy transferred onto the recording paper. A cut sheet is used as the recording paper. The cut sheet recording papers are enclosed in a sheet cassette 1008 attached in the LBP 900 and are conveyed one by one into the apparatus by a paper feed roller 1090 and conveying rollers 1100 and 1110 and supplied to the drum 1006.

As described above, the gradation number can be variably set in accordance with the memory capacity.

As described above, according to the invention, by variably setting a range to convert the multivalue data near white or black into the data of white or black, there is an effect that an image of high quality can be generated and the data amount can be reduced.

What is claimed is:

1. An output apparatus for generating, from first information input from an information processing apparatus, second information and for outputting the second information, said output apparatus comprising:

memory control means for distinguishing from each other binary data and multivalue data included in the input first information in mixture, and for controlling a memory to store the binary data and the multivalue data distinguishably;

decision means for deciding whether a conversion process for conversion into binary data should be applied to the multivalue data stored in the memory;

execution means for executing the conversion process on the multivalue data, responsive to a decision by said decision means that the conversion process should be so applied; and output means for generating the second information based on the binary data converted from the multivalue data and for outputting the second information in response to an instruction for outputting the second information.

2. An output apparatus according to claim 1, further comprising changing means for discriminating whether a change instruction has been input for changing the gradation number of the multivalue data included in the first information and for changing the gradation number to a designated number when it is discriminated that the change instruction has been input.

3. An output apparatus according to claim 1, further comprising changing means for comparing the gradation number of the multivalue data included in the first information with the maximum available gradation number in said output means and for changing the gradation number of the multivalue data to the maximum available gradation number when the former exceeds the latter.

4. An output apparatus according to claim 1, wherein the memory comprises a first memory and a second memory for storing binary data and multivalue data, respectively, and wherein said memory control means controls the first memory and the second memory to store the binary data and the multivalue data, respectively, distinguished by said memory control means.

5. An output apparatus according to claim 1, wherein said decision means decides whether the stored multivalue data comprise an image close to black data or white data, and wherein said execution means converts the multivalue data into black binary data when the multivalue data comprise an image close to black data and into white binary data when the multivalue data comprise an image close to white data.

6. An output apparatus according to claim 1, wherein said output means outputs the stored binary data, without execution of the conversion process by said execution means.

7. An output method of generating, from first information input from an information processing apparatus, second information and for outputting the second information, said method comprising the steps of:

distinguishing from each other binary data and multivalue data included in the input first information in mixture and controlling a memory to store the binary data and the multivalue data distinguishably;

deciding whether a conversion process for converting data into binary data should be applied to the stored multivalue data;

executing the conversion process on the multivalue data responsive to a decision in said deciding step decided that the conversion process should be applied; and generating the second information based on the binary data converted from the multivalue data and outputting the generated second information in response to an instruction for outputting the second information.

8. A method according to claim 7, further comprising the step of discriminating whether a change instruction has been input for changing the gradation number of the multivalue data included in the first information and changing the gradation number of a designated number when it is discriminated that the change instruction has been input.

9. A method according to claim 7, further comprising the step of comparing the gradation number of the multivalue data included in the first information with the maximum available gradation number in said generating and outputting step and changing the gradation number of the multivalue data to the maximum available gradation number when the former exceeds the latter.

10. A method according to claim 7, wherein the memory comprises a first memory and a second memory for storing binary data and multivalue data, respectively, and wherein, in said distinguishing and controlling step, the first memory and the second memory are controlled to store the binary data and the multivalue data, respectively, distinguished from each other.

11. A method according to claim 7, wherein, in said execution step, the multivalue data is converted into black binary data when it is decided that the multivalue data comprise an image close to black data and into white binary data when it is decided that the multivalue data comprise an image close to white data.

12. A method according to claim 7, wherein, in said generating and outputting step, the stored binary data is output without the conversion process.

13. A print control apparatus connected to a host computer, said apparatus comprising:

receiving means for receiving print data from the host computer, the print data including multi-value image data and a binary character code;

memory means for storing the multi-value image data and the binary character code received by said receiving means such that the multivalue image data and the character code can be distinguished from each other;

conversion means for converting a part of the multi-value image data stored in said memory means into binary image data: and analysis means for analyzing the binary character code stored in said memory means and converting the binary character code into a binary character pattern.

14. A print control apparatus according to claim 13, wherein said conversion means discriminates whether the part of the multi-value image data has a gradation number exceeding a certain value and converts the part of the multi-value image data into binary data if the part of the multi-value image data is discriminated to have the gradation number exceeding the certain value.

15. A print control apparatus according to claim 13, further comprising output means for outputting an image to a printer based on the multi-value image data other than the part of the multi-value image data, the binary image data converted by said conversion means, and the binary character pattern converted by said analysis means.

16. A print control apparatus according to claim 15, wherein if the multi-value image number has a gradation number exceeding a gradation number of said output means, said conversion means decreases the gradation number of the multi-value image data to the gradation number of said output means.

17. A method of print control, comprising the steps of:

receiving print data from a host computer, the print data including multi-value image data and a binary character code;

storing the multi-value image data and the binary character code received in said receiving step such that the multi-value image data and the character code can be distinguished from each other;

converting a part of the multi-value image data stored in said storing step into binary image data; and analyzing the binary character code stored in said storage step and converting the binary character code into a binary character pattern.

18. A method of print control according to claim 17, wherein said converting step includes the step of discriminating whether the part of the multi-value image data has a gradation number exceeding a certain value and converting the part of the multi-value image data into binary data if the part of the multi-value image data is discriminated to have the gradation number exceeding the certain value.

19. A method of print control according to claim 17, further comprising the step of outputting an image to a printer based on the multi-value image data other than the part of the multi-value image data, the binary image data converted in said converting step, and the binary character pattern converted in said analyzing step.

20. A method of print control according to claim 19, wherein if the multi-value image number has a gradation number exceeding a gradation number in said outputting step, said converting step includes the step of decreasing the gradation number of the multi-value image data to the gradation number of said outputting step.

21. A storage medium for use in a print control apparatus to generate and output data based on print data inputted from an information processing apparatus, the print data including multi-value image data and a binary character code, said storage medium storing a program to cause the print control apparatus to perform at least the processes of:

distinguishing between the multi-value image data of the print data and the binary character code of the print data such that the multi-value image data and the character code can be distinguished from each other;

converting a part of the multi-value image data into binary image data: and analyzing the binary character code and converting the binary character code into a binary character pattern.

22. A storage medium according to claim 21, wherein said converting process includes the process of discriminating whether the part of the multi-value image data has a gradation number exceeding a certain value and converting the part of the multi-value image data into binary data if the part of the multi-value image data is discriminated to have the gradation number exceeding the certain value.

23. A storage medium according to claim 21, further comprising the process of outputting an image to a printer based on the multi-value image data other than the part of the multi-value image data, the binary image data converted in said converting process, and the binary character pattern converted in said analyzing process.

24. A storage medium according to claim 23, wherein if the multi-value image number has a gradation number exceeding a gradation number in said outputting process, said converting process includes the process of decreasing the gradation number of the multi-value image data to the gradation number of said outputting process.

* * * * *

UNITED STATES PATENT AND TRADEMARK OFFICE
CERTIFICATE OF CORRECTION

PATENT NO. : 5,778,159
DATED     : July 7, 1998
INVENTOR(S) : NOBUYASU ITO

It is certified that error appears in the above-identified patent and that said Letters Patent is hereby corrected as shown below:

On the title page, item [57]:

ABSTRACT

Line 6, "reduced in" should read --reduced to; and
    Line 8, "set in" should read --set to--.

COLUMN 1

Line 4, "continuation-in-part" should read --continuation--;
    Line 10, "in" should read --in or--;
    Line 26, "halftone." should read --halftones.--;
    Line 45, "amount" should read --same amount--;
    Line 46, "data" should read --data is--;
    Line 49, "have to" should read --to have--;
    Line 51, "data. There" should read --data. ¶ There--;
    Line 55, Close up right margin;
    Line 56, Close up left margin;
    Line 59, Close up right margin; and
    Line 60, Close up left margin.

COLUMN 2

Line 46, "gradation" should read --gradations--.

UNITED STATES PATENT AND TRADEMARK OFFICE
CERTIFICATE OF CORRECTION

PATENT NO. : 5,778,159

DATED : July 7, 1998

INVENTOR(S) : NOBUYASU ITO

It is certified that error appears in the above-identified patent and that said Letters Patent is hereby corrected as shown below:

COLUMN 3

Line 2, "also" should be deleted;
    Line 15, "into" should read --in--;
    Line 17, "into" should read --in--;
    Line 44, "illustrated, such pixels are" should be deleted; and
    Line 45, "whole is" should read --whole, and such pixels are--.

COLUMN 4

Line 26, "is the" should read --is--;
    Line 28, "is the" should read --is--;
    Line 43, "white or not" should read --white, or not,--; and
    Line 65, "indicating" should read --indicates--.

COLUMN 5

Line 9, "into the" should read --into--;
    Line 18, "halftone" should read --halftones--; and
    Line 19, "set" should read --set in advance--.

UNITED STATES PATENT AND TRADEMARK OFFICE
CERTIFICATE OF CORRECTION

PATENT NO.  : 5,778,159
DATED       : July 7, 1998
INVENTOR(S) : NOBUYASU ITO

It is certified that error appears in the above-identified patent and that said Letters Patent is hereby corrected as shown below:

COLUMN 6

Line 43, "above described" should read --above-described--; and
    Line 56, "cross sectional" should read --cross-sectional--.

COLUMN 7

Line 1, "onto" should read --on--;
    Line 10, "on/off switches" should read --on/off-switches--; and
    Line 18, "copy transferred" should read --copy-transferred--.

COLUMN 8

Line 27, "decided" should be deleted.

Signed and Sealed this

First Day of June, 1999

*Attest:*

*Attesting Officer*

Q. TODD DICKINSON

*Acting Commissioner of Patents and Trademarks*